(No Model.) 2 Sheets—Sheet 1.

A. COLLIER.
OIL EXTRACTOR AND FEED WATER PURIFIER AND HEATER.

No. 604,370. Patented May 24, 1898.

Witnesses.
E. B. Bolton

Inventor:
Arthur Collier
By
his Attorneys.

(No Model.) 2 Sheets—Sheet 2.

A. COLLIER.
OIL EXTRACTOR AND FEED WATER PURIFIER AND HEATER.

No. 604,370. Patented May 24, 1898.

Witnesses:
E. B. Bolton

Inventor:
Arthur Collier
By
his Attorneys.

United States Patent Office.

ARTHUR COLLIER, OF GOOLE, ENGLAND, ASSIGNOR TO ISAAC SHIMWELL McDOUGALL, OF DIDSBURY, ENGLAND.

OIL-EXTRACTOR AND FEED-WATER PURIFIER AND HEATER.

SPECIFICATION forming part of Letters Patent No. 604,370, dated May 24, 1898.

Application filed April 1, 1898. Serial No. 676,111. (No model.)

*To all whom it may concern:*

Be it known that I, ARTHUR COLLIER, engineer, a subject of the Queen of Great Britain and Ireland, residing at 54 North street, Goole, in the county of York, England, have invented certain new and useful Improvements in and Relating to Oil-Extractors and Feed-Water Purifiers and Heaters, of which the following is a specification.

The present invention has reference to oil-extractors and feed-water purifiers, and is principally designed for the extraction of oily or greasy matters from the water of condensation used for feeding steam-boilers, but is of course applicable for other purposes.

The invention is designed for effecting the extraction of the oily or greasy matters contained in the water in a somewhat soluble form either with or without the use of certain chemical reagents, such as calcium chlorid or a mixture of calcium chlorid and caustic lime by which the oily matters are precipitated, and for assisting in or effecting the precipitation of lime with or without the use of certain chemical reagents, such as a mixture of caustic soda and carbonate of soda, and for assisting in or for effecting the purification of the water from other soluble substances.

The invention consists in heating the water containing the impurities to be extracted in its passage through the extractor by means of a pipe or series of pipes or tubes through which high-pressure steam is caused to pass, and is more especially applicable to such oil-extractors as are described in the specification to British Letters Patent No. 21,867/92 granted to me.

Figure 2:
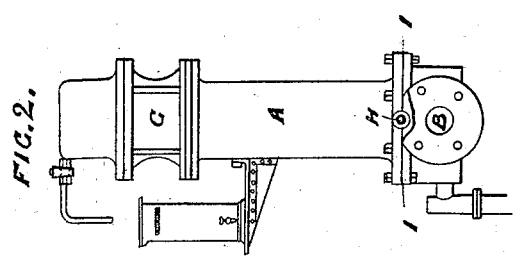
Figure 1:
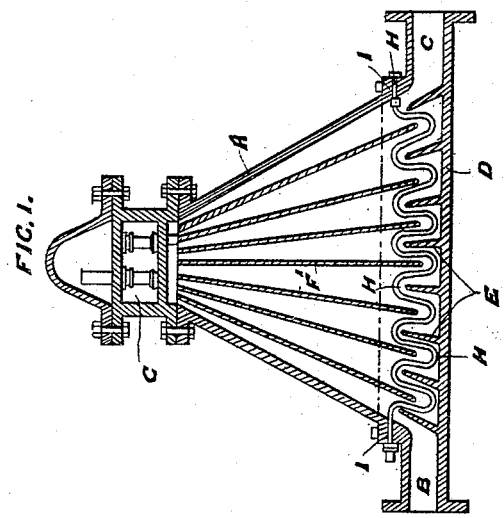
Figure 4:
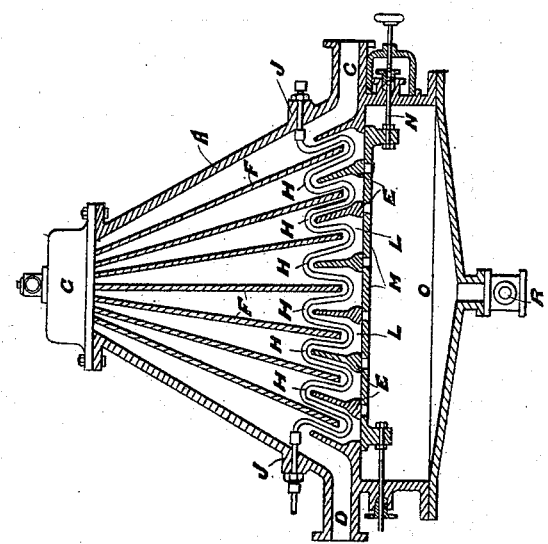
Figure 3:
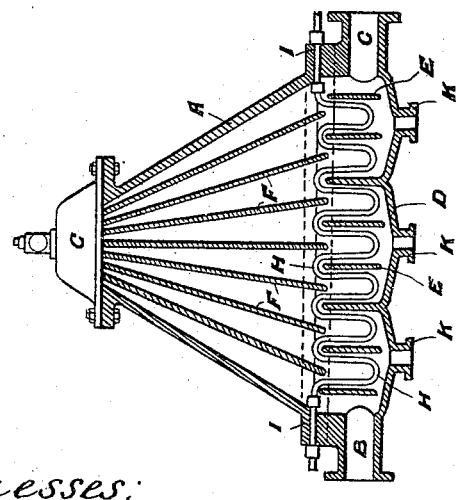

Several modifications of the invention are illustrated in the accompanying drawings and are as follows:

Figures 1 and 2 are longitudinal section and end elevation of a combined heater and oil-extractor. Fig. 3 is a longitudinal section illustrating a second modification of the same. Fig. 4 is a longitudinal section illustrating a third modification of the same.

In carrying my invention into effect, as illustrated in the drawings, a conical casing A is provided, such as one of those described in the specification of the aforementioned Letters Patent, and an inlet B and an outlet C are provided for the feed-water at the base thereof upon opposite sides, and the base may be a separate casting D, as in Figs. 1, 2, and 3, or in one with the casing A, as in Fig. 4. Similarly again in the casing there is provided a series of short partitions E, which project from the bottom preferably to a short equal extent into the casing, and projecting between such short partitions there are provided long radiating-partitions F', reaching toward the apex of the conical casing A, the interstitial spaces of such long radiating-partitions gradually lessening in width toward their upper extremity, above which a space G is provided for the collection of the oil.

A pipe H (or series of pipes may be employed) is arranged in a tortuous line between the opposing extremities of the short and long partitions E E of the casing A, this casing in the modifications shown at Figs. 1, 2, and 3 being divided, as shown and arranged, with the necessary flanges I I to form a joint to permit of the introduction of the pipe H.

High-pressure steam is caused to pass through the pipe H, and the water is taken in through the inlet B to the extractor and passes around the opposing edges of the short and long partitions E E toward the outlet C at the opposite end, being heated in its course by means of the high-pressure steam, thereby more effectually separating the oil contained in the water in a more or less soluble state, so that such oil may pass up the interstitial spaces of the long radiating-partitions F to the chamber G at the apex of the conical casing, whence it is drawn off. This action is preferably effected by the aid of chemical reagents, such as calcium chlorid or a mixture of calcium chlorid and caustic lime, which render the oily or greasy matters contained in the feed-water insoluble, and the oily or greasy particles so separated precipitate and the feed-water emanates at the outlet in a substantially pure condition.

In the arrangement illustrated at Fig. 3 the bottom portion D of the casing A is arranged with its short partitions E E not quite reaching the bottom of the casing, with the exception of every third or any other number of partitions, and this arrangement permits the discharge of the sediment through sludge-cocks K in a convenient manner without interfering with the flow of the water in its proper course. Hand-holes may be arranged at the sides of each division instead of sludge-cocks.

The method for removing the sediment at intervals (illustrated at Fig. 4) consists in forming ports L in each of the bottom divisions and governing these ports by a grid-slide M, operated by the hand-screw N. This forms practically a large sludge-cock with multiple passages, and the sediment is discharged into the chamber O and blown out from there by the cock R.

The use of a high-pressure-steam pipe or series of pipes in an extractor such as that before described may assist in or effect the precipitation of other soluble impurities, such as lime, a suitable reagent, such as a mixture of caustic soda and carbonate of soda, being employed to effect precipitation in the case of lime, which precipitation is more effectual and complete at the high temperature to which the water attains by contact with the high-pressure-steam pipes, and it may be further assisted by constructing the partitions of zinc and the coil or pipes of copper or any suitable metals to set up with water electrogalvanic action.

By the use of the present invention oily or greasy matters, lime, or other soluble impurities may be precipitated or extracted from feed-water without the use of chemical reagents, as the high temperature to which the water is subjected may suffice for this purpose.

Having thus described my invention, what I claim as new, and desire to secure by Letters Patent, is—

1. In combination the casing, the short partitions, the long partitions providing a circuitous passage for the water, and a heating-pipe in the casing and in the path of the water, substantially as described.

2. In combination, the casing, the series of short partitions extending up from the bottom thereof, a series of long partitions converging upwardly, said casing having a collecting-chamber for the oil and grease at its upper part, and the heating-pipe at the lower part of the casing, substantially as described.

3. In combination, the casing having the short partitions extending up therefrom, the longer partitions extending up in line with the spaces between the short partitions, the heater-pipe, the said casing having discharge-openings in its bottom for the sediment and the perforated grating L with means for adjusting the same to open or close the said discharge-openings, substantially as described.

In witness whereof I have hereunto set my hand in presence of two witnesses.

ARTHUR COLLIER.

Witnesses:
J. M. LIGHTBURN,
E. JACKSON.